United States Patent [19]

Iwamura et al.

[11] 4,129,859

[45] Dec. 12, 1978

[54] RASTER SCAN TYPE CRT DISPLAY SYSTEM HAVING AN IMAGE ROLLING FUNCTION

[75] Inventors: Masahiro Iwamura; Nagaharu Hamada; Toshitaka Hara, all of Hitachi; Nobuo Sato, Iwaki, all of Japan

[73] Assignee: Hitachi, Ltd., Japan

[21] Appl. No.: 766,728

[22] Filed: Feb. 8, 1977

[30] Foreign Application Priority Data

Feb. 12, 1976 [JP] Japan ................................ 51-13183

[51] Int. Cl.² ................................................ G06F 3/14

[52] U.S. Cl. ................................ 340/324 AD; 178/30

[58] Field of Search .................. 340/324 A, 324 AD; 364/200 MS File, 200, 900; 178/30

[56] References Cited

U.S. PATENT DOCUMENTS 3,242,470 3/1966 Hagelbarger et al. .......... 340/324 A 3,396,377 8/1968 Strout ........................... 340/324 AD 3,406,387 10/1968 Werme ......................... 340/324 AD

*Primary Examiner*—Marshall M. Curtis

*Attorney, Agent, or Firm*—Craig & Antonelli

[57] ABSTRACT

A raster scan type CRT display system is disclosed which has a randomly accessable refresh memory. The display system comprises column and row start address registers for defining a read start address for the refresh memory, column and row address counters for counting the contents of the column and row start address registers as start positions to generate a read address of the refresh memory for display, column and row cursor registors for defining a data entry position on a CRT screen, and column and row address generators for generating an entry address for the refresh memory based on the contents of the column and row start address registers and the contents of the column and row cursor registers, whereby a rolling or shifting of the image is effected and the refresh memory can be accessed by a processor for read/write operation without the need to monitor the image rolling.

5 Claims, 11 Drawing Figures

| (SX) | OUTPUT(53) OF COLUMN ADDRESS COUNTER |
|---|---|
| 0 | 0 1 2 3 4 ---------- 74 75 76 77 78 79 |
| 1 | 1 2 3 4 5 ---------- 75 76 77 78 79 0 |
| 2 | 2 3 4 5 6 ---------- 76 77 78 79 0 1 |
| 3 | 3 4 5 6 7 ---------- 77 78 79 0 1 2 |
| 4 | 4 5 6 7 8 ---------- 78 79 0 1 2 3 |
| ⋮ | ⋮ ⋮ |
| 75 | 75 76 77 78 79 ---------- 69 70 71 72 73 74 |
| 76 | 76 77 78 79 0 ---------- 70 71 72 73 74 75 |
| 77 | 77 78 79 0 1 ---------- 71 72 73 74 75 76 |
| 78 | 78 79 0 1 2 ---------- 72 73 74 75 76 77 |
| 79 | 79 0 1 2 3 ---------- 73 74 75 76 77 78 |

| (CX+SX) | ROM OUTPUT | CX+SX | ROM OUTPUT |
|---|---|---|---|
| 0 | 0 | 80 | 0 |
| 1 | 1 | 81 | 1 |
| 2 | 2 | 82 | 2 |
| ⋮ | ⋮ | ⋮ | ⋮ |
| 77 | 77 | 157 | 77 |
| 78 | 78 | 158 | 78 |
| 79 | 79 | | |

RASTER SCAN TYPE CRT DISPLAY SYSTEM HAVING AN IMAGE ROLLING FUNCTION

BACKGROUND OF THE INVENTION

The present invention relates to a raster scan type CRT (Cathode-Ray Tube) display system.

A raster scan type CRT display system usually includes a refresh memory of a capacity equal to the number of a field of characters displayed, and coded data in the refresh memory is read out character-by-character under the control of a timing control circuit for displaying them on a CRT viewer.

When displayed data is to be read or written by a processor, an address of the refresh memory is designated by a cursor register (See, for example, U.S. Pat. No. 3,771,155 to Yukitaka Hayashi et al entitled "Color Display System"). When more information is to be displayed, a large size CRT and a large capacity refresh memory are required. This leads to considerable increase in cost. Furthermore, because of a practical limit of the size of the CRT, it is difficult to obtain a large size CRT capable of displaying more than several thousands characters at a reasonable cost.

As one approach to accomplish the display of a large amount of information with a limited size CRT and a limited capacity refresh memory, there is the so-called image rolling technique in which displayed characters are moved during display.

According to this method, in the case of rolling up, for example, the displayed characters are shifted upwardly line-by-line while additionally displaying new data in the lowermost line so that a large number of characters exceeding in number the one field of characters displayed can be displayed.

When the rolling of the displayed image is to be effected, it is necessary to relatively shift the character position address on the screen and the read address of the refresh memory. Furthermore, in reading or writing data by the processor for the shifted image, the address must be designated taking the shift of the read address into consideration.

Heretofore, no satisfactory solution for such requirements has been known.

SUMMARY OF THE INVENTION

It is an object of the present invention to provide a raster scan type CRT display system capable of displaying data while cyclically rolling the displayed image with a simple circuit arrangement.

It is another object of the present invention to provide a raster scan type CRT display system which allow memory access by a processor when the processor reads or write the rolled image without the need for paying attention to a shift between a physical address on the rolled display image and an address of the refresh memory.

It is still another object of the present invention to enable read/write operation by a processor for the rolled image with a simple circuit arrangement.

It is a further object of the present invention to provide a raster scan type CRT display system which attains a rolling function as well as a read/write function by a processor for the rolled image with a simple circuit arrangement and a low cost.

In one aspect of the present invention, row and column start address registers for defining a start address of refresh memory are provided, the contents of the start address registers being set to appropriate values, and the settings of the start address registers being modified at an appropriate time interval to cyclically roll the displayed image.

In another aspect of the present invention, an address counter is provided to which the content of the column start address register is preset for each horizontal scan and which counts up character clock pulses starting from the preset count to produce a circular display column address.

According to still another aspect of the present invention, an address counter is provided to which the content of the row start address register is preset for each vertical scan and which counts up line clock pulses starting from the preset count to produce a circular display row address.

According to a further aspect of the present invention, an address generator is provided which produces a read/write address of the refresh memory based on the contents of a cursor address register and the start address registers.

According to a still further aspect of the present invention, the address generator comprises two adders, a comparator and a complementer.

According to a furthermore aspect of the present invention, the address generator comprises an adder and a read only memory.

DESCRIPTION OF THE PREFERRED EMBODIMENTS

Figure 1:
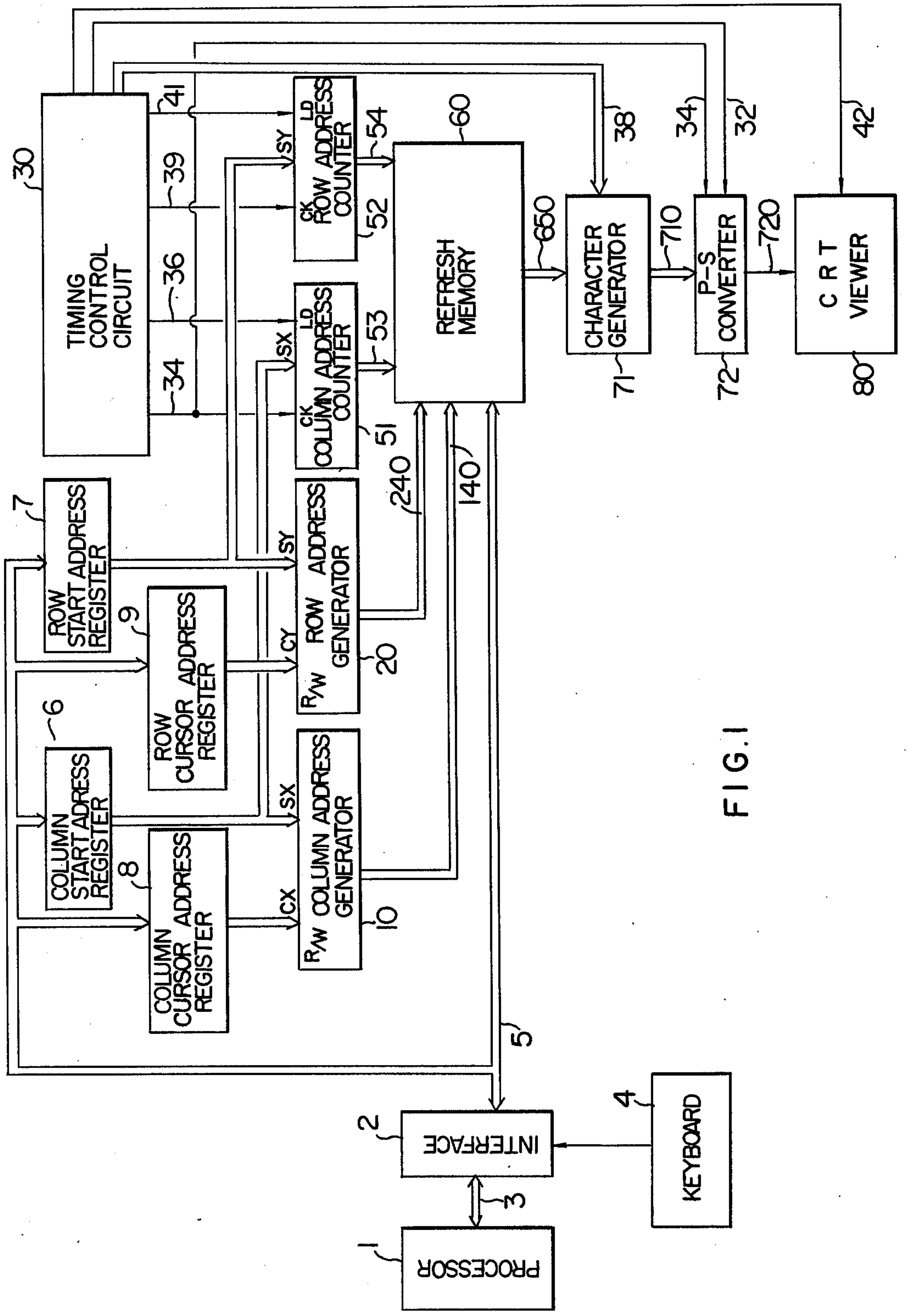
FIG. 1 is a block diagram showing a preferred embodiment of the present invention.

A CRT display system of the present invention shown in FIG. 1 comprises a processor 1 and a keyboard 4. The processor 1 is connected to an interface 2 through an interface bus 3. The interface 2 controls I/O (input/output) operations of data and control signals between the processor 1 and a CRT display. A timing control circuit 30 produces horizontal and vertical deflection signals 42 for a CRT viewer 80 and also produces various timing signals as described later. A refresh memory 60 comprises a RAM (Random Access Memory) with a storage capacity equal to the number of characters displayed on one field, and stores display data in coded form. A read address of the refresh memory 60 is designated by a display column address 53 and a display row address 54, and the output character code 650 is fed to a character generator 71 comprising a ROM (Read Only Memory) which stores character patterns in the form of, for example, 5 × 7 dot pattern and produces a character pattern 710 for a raster designated by a raster address 38, of the character pattern corresponding to the character code 650.

A P-S converter 72 receives a parallel character pattern 710 from the character generator 71 under the control of a character clock 34 and converts it to a serial character pattern 720 under the control of a dot clock 32.

The CRT viewer 80 has its horizontal and vertical deflections controlled by a timing signal 42 to display a field of display data of the refresh memory 60. Column and row cursor address registers 8 and 9 designate a column address and a row address respectively, of the refresh memory 60 in the data transfer (read/write operation) between the processor 1 and the refresh memory 60. Column and row start address registers 6 and 7 are newly provided in the present invention. In a prior art display which lacks such registers, the relation between a character position address on a display screen and a read address of the refresh memory 60 has been fixed. That is, if the character position address on the screen is given by (x, y), the read address of the refresh memory 60 for the display is also given by (x, y). Similarly, if the contents of the cursor registers 8 and 9 are given by (r, s), the address (r, s) of the refresh memory 60 is accessed by the processor 1.

In accordance with the feature of the present invention, it is intended to move the displayed characters on the screen to display more information. In effecting the rolling of the image, it is necessary to relatively shift the character position address on the screen and the read address of the refresh memory, and in the read/write operation by the processor 1 for the shifted image, the address must be designated taking the shift of the read address into consideration.

In the present invention, for the movement of the image, the start address registers 6 and 7 and the address counters 51 and 52 are provided for the columns and the rows respectively, and for the access by the processor 1 to the shifted image, the read/write address generators 10 and 20 are provided.

Before explaining the characteristic portions of the present invention, major sections of the timing control circuit 30 will be explained with reference to FIGS. 2 and 3.

Figure 2:
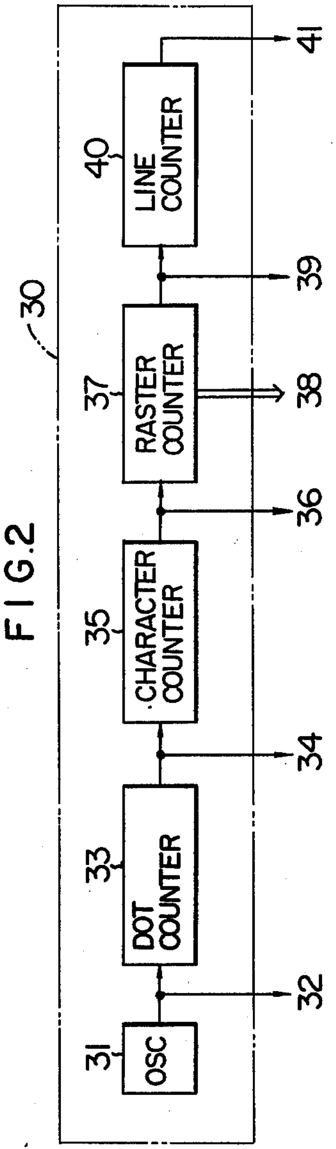
FIG. 2 is a circuit diagram illustrating a principle arrangement of a timing control circuit in FIG. 1.

Referring to FIG. 2, a clock oscillator 31 for producing dot clock pulses 32 is shown. A dot counter 32 defines the number of horizontal dots for one character and it produces a character clock pulse 34 each time it counts up a predetermined number of dot clock pulses 32. A character counter 35 defines the number of character slots in one horizontal scan line and it produces a raster clock pulse 36 each time it counts up a predetermined number of character clock pulses 34. A raster counter 37 defines the number of vertical dots for one character and it produces a line clock pulse 39 each time it counts up a predetermined number of raster clock pulses 36. A line counter 40 defines the number of line slots and it produces a frame clock pulse 41 each time it counts up a predetermined number of line clock pulses 39.

Figures 3, 4:
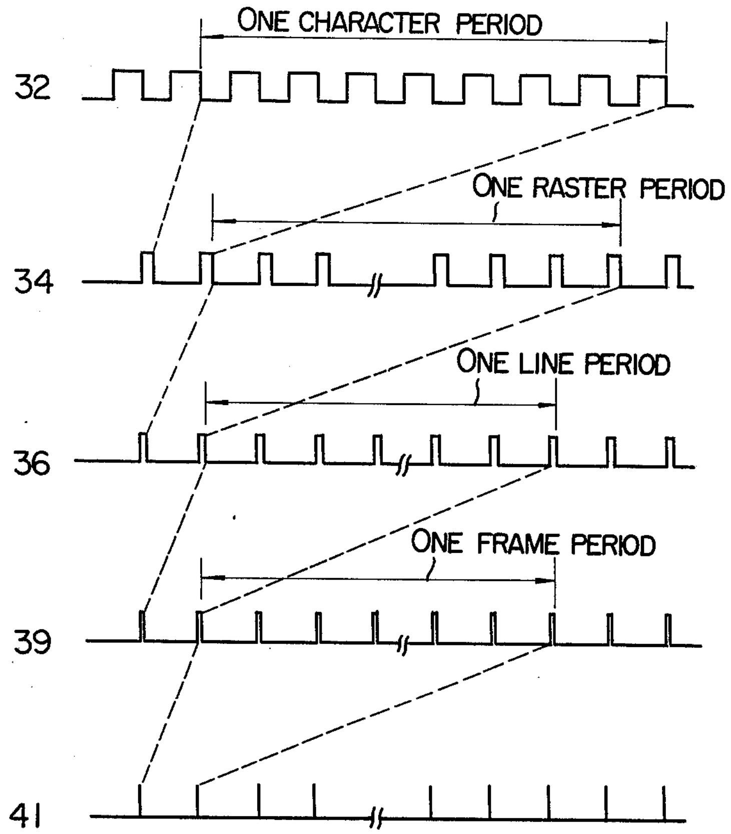
FIG. 3 is a time chart for explaining the operation of the circuit of FIG. 2.
FIG. 4 is a chart for illustrating a relation between the content of a column start address register and the content of a column address counter in FIG. 1.

FIG. 3 shows a timing relation between the dot clock 32, the character clock 34, the raster clock 36, the line clock 39 and the frame clock 41. As is apparent from FIG. 3, the dot clock pulses 32 which are equal in number to the number of horizontal dots for one character are included in one character period, and a character clock pulse 34 is produced whenever one character period has elapsed. A raster clock pulse 36 is produced whenever there has elapsed one raster period including the character clock pulses which are equal in number to the number of characters in one raster. A line clock pulse 39 is produced whenever there has elapsed one line period including the raster clock pulses 36 which are equal in number to the number of vertical dots for one character. Furthermore, a frame clock pulse 41 is produced whenever there has elapsed one frame period including the line clock pulses 39 which are equal in number to the number of lines in one frame.

For the sake of convenience of the explanation, it is assumed that the CRT viewer 80 has a display capacity of m x n with m representing the number of characters displayed in one column and n representing the number of vertical displayed characters.

In this case, the column address counter 51 comprises a modulo m counter and has its clock input CK connected to the character clock 34 and its load input LD connected to the raster clock 36. Thus, when the raster clock 36 is "1", the content SX of the column start address register 6 is synchronously preset to the address counter 51 at a trailing edge of the character clock 34, and the address counter 51 operates as the modulo m counter starting from the preset value SX as a start point for the display column address to produce a circular sequence of the display column addresses 53.

FIG. 4 shows a relation between the content SX of the column start address register 6 and the output 53 of the column address counter 51 when m is equal to 80. It is seen from FIG. 4 that as the start point of the display column address is changed from 0 to 79 in accordance with the content SX of the column start address register 6, a sequence of display column addresses are circularly produced.

The row address counter 52 comprises a modulo n counter and has its clock input CK connected to the line clock 39 and its load input LD connected to the frame clock 41. Thus, when the frame clock 41 is "1", the content SY of the row start address register 7 is synchronously preset to the address counter 52 at a trailing edge of the line clock 39, and the address counter 52 operates as the modulo n counter starting from the preset count SY as a start point of the display row address to produce a circular sequence of display row addresses.

As is apparent from the above description, it is possible to move the displayed image slowly or rapidly by appropriately setting the contents of the column and row start address registers and changing the settings thereof at an appropriate time interval.

Setting or modification of the contents of the start address registers 6 and 7 can be carried out by the processor 1 through the interface 2 and the data bus 5 by a command from the keyboard 4.

While only the data bus 5 is shown, timing signals to the registers 6 through 9 are derived from the interface 2.

Figure 5A:
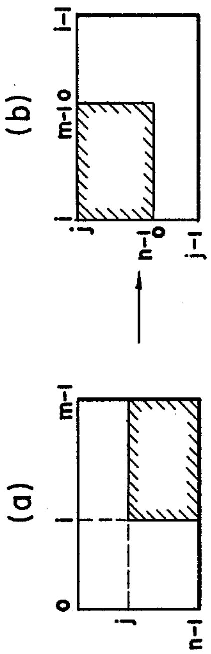
FIGS. 5A to 5C illustrate examples of the movement of displayed images.
Figure 5B:
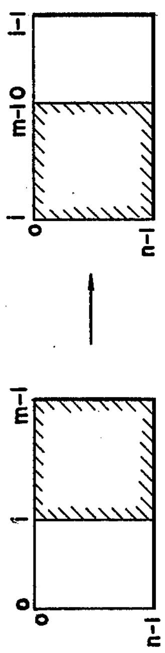
Figure 5C:
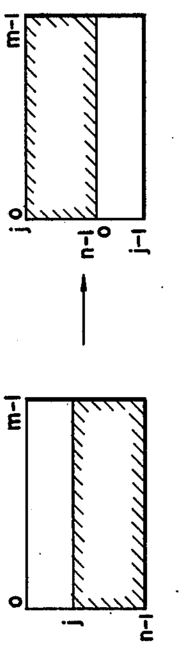

FIGS. 5A to 5C illustrate the movement of the displayed image. FIG. 5A shows that the displayed image shown in (a) changes to that shown in (b) by setting the content of the column start address register 6 to i and the content of the row start address register 7 to j. FIG. 5B shows that the image shown in (a) changes to that shown in (b) by setting the content of the column start address register 6 to i and the content of the row start address register 7 to 0, and FIG. 5C shows that the image shown in (a) changes to that shown in (b) by setting the content of the column start address register 6 to 0 and the content of the row start address register 7 to j.

In this manner, a desired shift of the displayed image is attained by the settings of the start address registers 6 and 7, and the displayed image can be moved slowly or rapidly by changing the settings of the registers at an appropriate time interval.

When the processor 1 carries out a read/write operation for the displayed data for the refresh memory 60, an address is designated by the column and row cursor address registers 8 and 9. This address represents physical column and row addresses of the CRT viewer 80.

In the case where the start address registers 6 and 7 are not provided, that is, the movement of the displayed image is not included as in the prior art display, the column and row addresses would be the address of the refresh memory because the physical address of the image is fixedly related to the address of the refresh memory.

In accordance with the present invention, the start address registers 6 and 7 are provided to shift the display start address to allow shifting display, and the column and row address generators 10 and 20 for read/write operation are provided to allow the use of the modified column and row addresses as the actual read/write address for the refresh memory.

Figure 6:
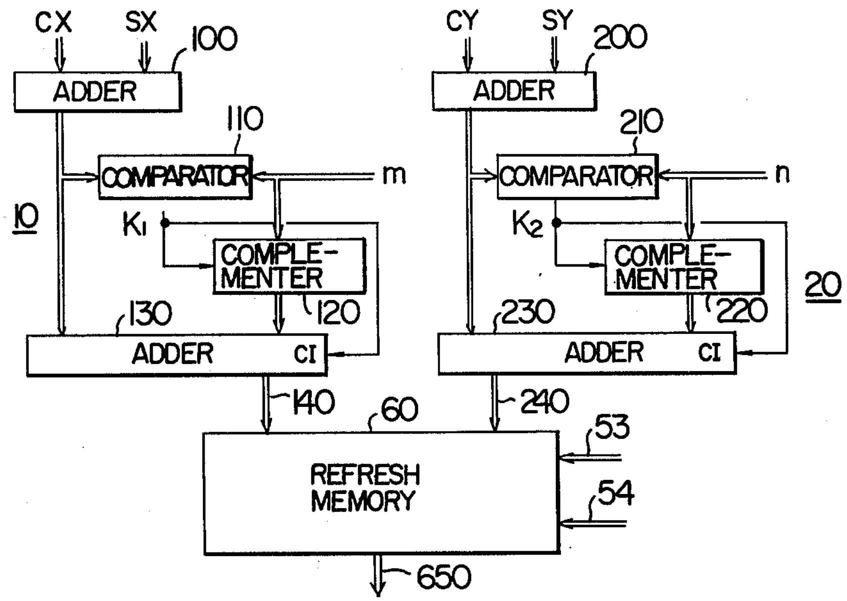
FIG. 6 shows a circuit diagram of a specific embodiment of the read/write address generators in FIG. 1.

A specific embodiment of the address generators 10 and 20 is shown in FIG. 6. The column address generator 10 comprises an adder 100, a comparator 110, a complementer 120 and an adder 130, and the row address generator 20 comprises an adder 200, a comparator 210, a complementer 220 and an adder 230.

Figure 7:
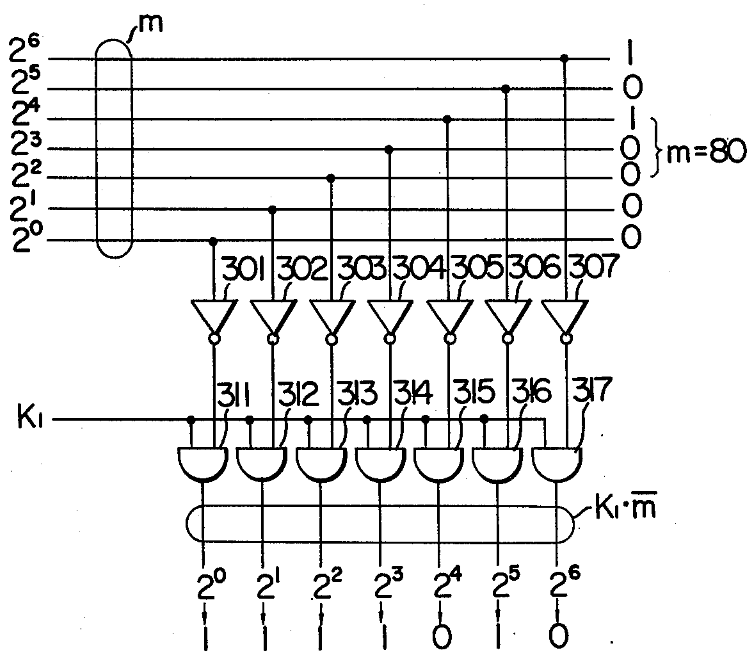
FIG. 7 shows a circuit diagram of a specific embodiment of a complementer in FIG. 6.

The adder 100 sums the content CX of the column cursor register 8 and the content SX of the column start address register 6 and feeds the resulting sum to the comparator 110 and the adder 130. The comparator 110 compares the output (CX + SX) of the adder 100 with the number m of the horizontal displayed characters and produces a "1" output $k_1$ when the sum (CX + SX) is equal to or greater than m. The complementer 120 produces a complement output of m when the output $k_1$ is "1" and produces a zero output when the output $k_1$ is "0". The complementer 120 may comprises, as shown in FIG. 7, inverters 301 to 307 and AND gates 311 to 317. When m is equal to 80, the binary representation thereof is "0000101" while the complement thereof is represented by "1111010". The adder 130 serves to subtract the number m of the horizontal displayed characters from the output of the adder 100 (i.e. to add the complement thereof) when the output $k_1$ of the comparator 110 is "1". The output 140 of the adder 130 is fed to the refresh memory 60 as the read/write column address for the refresh memory 60.

A similar procedure is taken for the generation of the read/write row address for the refresh memory 60. Namely, the output CY of the row cursor address register 9 is summed with the output SY of the row start address register 7 in the adder 200, and the resulting sum is compared with the number n of the vertical displayed characters by the comparator 210. When the former is equal to or greater than n, the complementer 220 produces a complement of n, which is fed to the adder 230 to subtract the number n of the vertical displayed characters from the output of the adder 200. The output 240 of the adder 230 is fed to the refresh memory 60 as the read/write row address.

Thus, the address generators 10 and 20 shown in FIG. 6 carry out the following address calculation based on the contents of the column and row cursor address registers 8 and 9 and the column and row start address registers 6 and 7 to produce the read/write column and row addresses XA and YA for the refresh memory 60.

$$XA = CX + SX - mK_1\,(XA = 0 \sim m - 1) \qquad (1)$$

$$YA = CY + SY - nK_2\,(YA = 0 \sim n - 1) \qquad (2)$$

Here, XA is the read/write column address for the refresh memory 60 ($0 \sim m-1$), YA the read/write row address for the refresh memory 60 ($0 \sim n-1$), CX the content of the column cursor address register 8 ($0 \sim m-1$), CY the content of the row cursor address register 9 ($0 \sim n-1$), SX the content of the column start address register 6 ($0 \sim m-1$), SY the content of the row start address register 7 ($0 \sim n-1$), m the number of horizontal displayed characters, and n the number of vertical displayed characters. $K_1$ is equal to 1 when $CX + SX \geqq m$ and equal to 0 when $CX + SX < m$. $K_2$ is equal to 1 when $CY + SY \geqq n$ and equal to 0 when $CY + SY < n$.

Figures 8, 9:
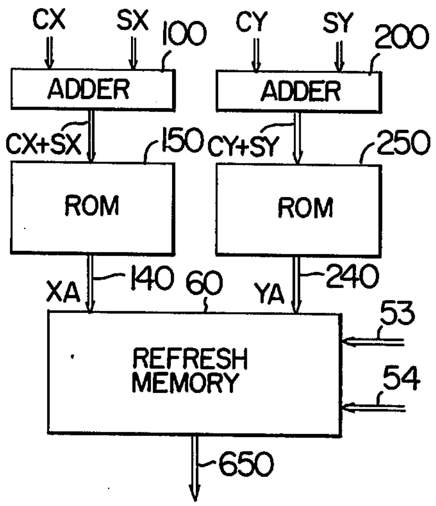
FIG. 8 shows another embodiment of the address generators in FIG. 1.
FIG. 9 is a chart showing the content of the ROM table used in FIG. 8.

FIG. 8 shows another embodiment of the address generators 10 and 20. Comparing the present embodiment with the embodiment of FIG. 6, it is seen that the comparator 110, the complementer 120 and the adder 130 in FIG. 6 have been replaced by a ROM 150 in FIG. 8 and the comparator 210, the complementer 220 and the adder 230 in FIG. 6 have been replaced by a ROM 250 in FIG. 8. In this instance, the ROM 150 is programmed with the results of the address calculation at the respective addresses thereof corresponding to the sum (CX + SX). An example of the programmed content is shown in FIG. 9, which shows the relation between the sum (CX + SX) and the output of the ROM when the number m of the horizontal displayed characters is equal to 80.

Similarly, the ROM 250 is programmed with the results of the address calculation at respective addresses thereof corresponding to the sum (CY + SY).

As described hereinabove, in accordance with the preferred embodiments of the present invention, the displayed image can be cyclically rolled, and when the processor carries out the read/write operation to the rolled image, it can access by means of the physical position address on the screen represented by the column and row cursor registers without the need for paying attention to the shift between the physical address on the displayed image and the address of the refresh memory due to rolling of the displayed image.

Furthermore, the present invention achieves the above functions with a simple circuit arrangement and a low cost.

We claim:

1. A raster scan type CRT display system having an image rolling function wherein coded data stored in a refresh memory is read out in synchronism with the scan of a CRT display and is displayed on a CRT viewer in accordance with a sequence of display column and row addresses, said CRT viewer having a display capacity of m columns by n rows and said refresh memory can be accessed by a processor for read/write operation, said display system comprising:

said refresh memory being randomly accessable and having a storage capacity of at least m x n characters;

a timing control circuit for generating timing signals which include character clock pulses and line clock pulses;

column and row start address registers for defining a read start address for said refresh memory;

column and row cursor address registers for defining an address for the read/write operation by said processor to said refresh memory;

a modulo m address counter to which the content of said column start address register is preset for each horizontal scan and which counts up the character clock pulses from said timing control circuit starting from the preset count to produce a sequence of display column addresses; and a modulo n address counter to which the content of said row start address register is preset for each vertical scan and which counts up the line clock pulses from said timing control circuit starting from the preset count to produce a sequence of display row addresses.

2. A raster scan type CRT display system according to claim 1, further comprising address generators for generating the column and row read/write addresses for said refresh memory based on the contents of said column and row cursor address registers and the contents of said column and row start address registers.

3. A raster scan type CRT display system according to claim 2, wherein each of said column and row address generators includes a first adder for summing the content of the corresponding cursor address register with the content of the corresponding start address register, a comparator for comparing an output of said first adder with the number m or n of the horizontal or vertical displayed characters to produce a "1" output when the output of said first adder is equal to or greater than m or n, a complementor for producing a complement of the number m or n of the horizontal or vertical displayed characters only when the output of said comparator is "1", and a second adder for summing the output of said first adder with the output of said complementer to produce the read/write address.

4. A raster scan type CRT display system according to claim 2, wherein each of said column and row address generators includes an adder for summing the content of the corresponding cursor address register with the content of the corresponding start address register, and a read only memory responsive to an output of said adder for producing a read/write address for said refresh memory determined by said output of said adder.

5. A raster scan type CRT display system wherein coded data stored in a refresh memory is read out in synchronism with the scan of a CRT display and is displayed on a CRT viewer having a display capacity of m columns by n rows and said refresh memory can be accessed by a processor for read/write operation, said display system comprising:

said refresh memory having a storage capacity of at least m x n characters;

a timing control circuit for generating timing signals which include character clock pulses and line clock pulses;

column and row start address registers for defining a read start address for said refresh memory;

said processor connected to said CRT display system through an interface to access to said refresh memory for the read/write operation;

a keyboard for issuing a read/write command to said processor through said interface;

column and row cursor address registers for defining an address for the read/write operation by said processor to said refresh memory;

a modulo m address counter to which the content of said column start address register is preset for each horizontal scan and which counts up the character clock pulses from said timing control circuit starting from the preset count to produce a sequence of display column addresses;

a modulo n address counter to which the content of said row start address register is preset for each vertical scan and which counts up the line clock pulses from said timing control circuit starting from the preset count to produce a sequence of display row addresses;

first adders for summing the contents of said column and row cursor address registers with the contents of said column and row start address registers respectively;

comparators for comparing the respective outputs of said first adders with the numbers m and n of the horizontal and vertical displayed characters respectively, to produce "1" outputs when the respective output of said first adders is equal to or greater than m or n respectively;

complementers for producing complement outputs of the numbers m and n of the horizontal and vertical displayed characters only when the respective output of said comparators is "1";

second adders for summing respective outputs of said first adders with the respective outputs of said complementers to produces the read/write address;

a character generator for generating a character signal corresponding to coded data read from said refresh memory;

a parallel-serial converter for converting the parallel character signal from said character generator to a serial character signal; and said CRT viewer having a display capacity of m columns by n rows.

* * * * *